Patented Dec. 19, 1944

2,365,534

UNITED STATES PATENT OFFICE 2,365,534

ART OF BREADMAKING

Charles G. Ferrari, Minneapolis, Minn., assignor to The Mathieson Alkali Works, Inc., New York, N. Y., a corporation of West Virginia No Drawing. Application November 13, 1941, Serial No. 419,023

8 Claims. (Cl. 99—91)

This invention relates to a composition of matter adapted for use in the making of bread and the like. It relates more particularly to what is known as a "bread improver" in that by its use a baked product having superior properties, including improved volume, grain and texture, may be produced.

Bread improvers are extensively used by the baking industry as an ingredient of bread dough to improve the quality of the baked product. In certain crop years it has been found that the physical properties of gluten are deficient and, to improve these properties, it has been customary to add to the dough bread improvers containing active oxidizing agents such as bromates, iodates and persulfates.

While bread improvers containing these oxidizing agents have been found effective in improving the gluten of the dough, their use has not been wholly satisfactory. Some such bread improvers have been found to leave an objectionable residue in the bread. For example, the residue left by potassium bromate is potassium bromide, a well known sedative. From a public health standpoint it is preferable not to have any substantial quantity of a sedative such as bromide in bread.

The bread improver of the present invention comprises a relatively small proportion of an edible alkali or alkaline earth salts of chlorous acid, such as sodium chlorite, potassium chlorite, ammonium chlorite and calcium chlorite, thoroughly incorporated with an edible filler or carrier having a low moisture content.

The use of chlorites as bread improvers has previously been suggested and when used under certain conditions they have been found to give superior results. However, prior to my present invention, the use of these chlorites as bread improvers has not been generally satisfactory.

The proportion of the chlorite used for this purpose is extremely small and to be effective it must be uniformly dispersed throughout the dough. Normally, not over a few thousandths of a percent of the chlorite is desirable.

To relieve the baker of the necessity of such careful weighing of the chlorite, and to facilitate its dispersion in the dough, it has been suggested that the chlorite be supplied to the baker admixed with the flour. For instance, it has been proposed that the chlorite be incorporated with the flour during the grinding process. Where the chlorite has been premixed with flour, the results have lacked uniformity and have been generally unsatisfactory. Though the chlorites are normally relatively stable, the mixture of the chlorites with ordinary flour appears to be unstable, and the effectiveness of the chlorite in the mixture as a bread improver diminishes upon standing.

The present invention is based upon the discovery that uniformly superior results are obtained by incorporating in the dough a previously prepared bread improver comprising an intimate blend of the chlorite with flour or a similar edible starchy substance, as a carrier, providing the moisture content of the blend is sufficiently low. Such results have been consistently obtained when the moisture content of the blend does not substantially exceed 9% by weight.

It now appears that the unsatisfactory results heretofore obtained by the use of these chlorites as bread improvers were due, at least in part, to the instability of the chlorites in the presence of ordinary flour, the moisture content of which usually substantially exceeds 9% by weight.

In accordance with the present invention, the chlorite may be supplied to the baker in a powdered condition thoroughly admixed with a relatively large proportion of a finely divided edible carrier or filler such as corn, rice, tapioca, or other suitable starches or cereal flours such as wheat or rye flour predried to a moisture content not substantially exceeding 9% by weight. In such dry condition these carrier materials are chemically inert with respect to the chlorite. For example, the prepared mixture may consist of about 0.2 part of the chlorite and 99.8 parts of a carrier sluch as mentioned above, preferably a starchy material which is chemically inert with respect to the constituents of the dough. This powdered mixture may be packaged and sold as such to the baker who may employ it in making bread dough in proportions of about 0.5% of the packaged mixture on the weight of flour used.

It will, of course, be understood that the relative proportions of the ingredients of the mixture and the proportion of the mixture added to the dough may be varied according to the baking properties of the particular flour being used in making the dough. For example, a larger proportion of chlorite may be incorporated in the mixture and a smaller proportion of the mixture used in making the dough or the bread improver may be prepared in a less concentrated form and a correspondingly larger amount used. It is usually preferable to use a large proportion of the carrier so as greatly to increase the bulk of the bread improver and thereby relieve the baker of tedious weighing and facilitate dispersion of the chlorite through the dough.

If desired, one or more of the commonly known yeast foods may be incorporated in the bread improver for the purpose of stimulating yeast growth and activity. An example of a suitable composition which has given superior results is as follows:

|  | Per cent by weight |
|---|---|
| Sodium chlorite | 0.2 |
| Ammonium chloride | 9.8 |
| Calcium sulfate | 25.0 |
| Sodium chloride | 25.0 |
| Corn starch (filler) | 40.0 |

The above-described bread improver may be produced by intimately blending or mixing the ingredients, preferably in a finely divided state, to form a homogeneous mixture which may be used by the baker, for example in the proportions of ½ pound of the mixture to 100 pounds of flour.

It is generally recognized in the baking industry that flours may vary from year to year as to their baking characteristics. For each flour there is an optimum quantity of bread improver for the production of bread having the desired volume, grain, texture and dough-handling characteristics. Accordingly, the quantity of chlorite used in the bread improver of the present invention may be varied from year to year according to the requirements of the particular flour with which it is used. Preferably, however, the proportion of chlorite in the bread improver is maintained constant and the variation in the requirement for different types of flours is taken care of by varying the amount of bread improver employed. In any event, it will be apparent that the important consideration is the amount of chlorite added to the flour and it is relatively immaterial, within limits, how much inert carrier is employed. The quantity and type of yeast food may also be varied. However, the proportions stated above have been found to be generally suitable.

Further, it has been found by experimental baking tests that, with certain bread flours, the desired characteristics of the dough and bread baked therefrom are more readily obtainable when a suitable mixture of oxidizing agents, such as one of the chlorites mentioned above and a suitable small amount of an additional oxidizing agent such as persulfate, iodate or bromate, is employed. An example of such a composition which has given satisfactory results is as follows:

|  | Per cent by weight |
|---|---|
| Sodium chlorite | 0.15 |
| Potassium iodate | 0.10 |
| Ammonium chloride | 9.0 |
| Sodium chloride | 25.0 |
| Calcium sulfate | 25.0 |
| Corn starch (filler) | 40.75 |

The above-described mixture may be produced by intimately blending or mixing the ingredients, preferably in a finely divided condition, in the proportions stated to form a homogeneous mixture which may be supplied to the baker to be used by him in the making of dough in proportions of about ¼ pound of the mixture to 100 pounds of flour.

The bread improver of the present invention, whether it contains only a chlorite such as previously mentioned as the active ingredient or has incorporated therewith a yeast food, or in addition thereto a smaller quantity of some other oxidizing agent such as previously mentioned, has been found to leave no objectionable residue in the baked product. Such residue as is formed is wholly innocuous and is entirely unobjectionable from a public health standpoint. For instance, the residue left by sodium chlorite is sodium chloride, i. e. ordinary table salt.

Though each of the chlorites previously mentioned is suitable for the purpose of this invention, at present sodium chlorite is preferable, due to its ready commercial availability in a satisfactory pure form. Chlorites suitable for the purpose herein set forth may be prepared as described in the United States Patents Nos. 2,092,944, 2,092,945 and 2,169,066. The calcium and ammonium chlorites are regarded as particularly advantageous for the reason that Ca and $NH_4$ ions are recognized yeast stimulants and yeast foods.

Even where yeast food substances and other oxidizing agents such as mentioned in the foregoing examples are incorporated with the chlorite and carrier, the resulting bread improver mixture is stable and may be stored for long periods of time without loss of effectiveness providing the moisture content of the mixture does not substantially exceed 9% by weight. Where the moisture content substantially exceeds 9%, the mixture has been found to be unstable and to rapidly lose its effectiveness.

The moisture content of the bread improver of the present invention is advantageously less than 9% by weight and is preferably not in excess of about 4% to 5%.

As previously noted, the optimum proportion of chlorite to be incorporated with the dough depends largely upon the peculiarities of the particular flour used. However, satisfactory results are usually obtained where the amounts and concentrations of the bread improver used are such that the proportion of chlorite incorporated in the dough is from 0.2 milligram to 2.0 milligrams per 100 grams of flour.

The use of the bread improver of the present invention is especially advantageous in doughs having a tendency to become sticky. It has been found that its use under such circumstances generally results in a drier and more pliable dough than is otherwise readily obtainable.

Further, the characteristics of the resulting baked product are materially improved by the incorporation of the chlorite in the dough. For instance, the grain and texture of the bread are improved and the cell structure is thereby changed from the heavy-walled spherical cells to substantially thinner-walled elongated cells with the result that the bread has a silky texture and better eating characteristics.

The composition of the bread improver mixture should normally be such as to give, in aqueous solution, a pH value on the acid side. However, the characteristics of the mixture may be made either acid or alkaline as desired, for instance by the addition of buffer salts such as mixtures of phosphates, without detrimentally affecting the stability of the chlorite, providing the free moisture content of the composite bread improver does not substantially exceed 9% by weight.

I claim:

1. A bread improver comprising a relatively small proportion of a chlorite of the group consisting of sodium, potassium, ammonium and calcium chlorites dispersed in an edible carrier which is inert with respect to the chlorite, the moisture content of the mixture not substantially exceeding 9% by weight.

2. A bread improver comprising a relatively small proportion of a chlorite of the group consisting of sodium, potassium, ammonium and calcium chlorites dispersed in a carrier of edible starchy material, the moisture content of the mixture not substantially exceeding 9% by weight.

3. A bread improver comprising a relatively small proportion of a chlorite of the group consisting of sodium, potassium, ammonium and calcium chlorites and a yeast food dispersed in an edible carrier which is inert with respect to the chlorite and the yeast food, the moisture content of the mixture not substantially exceeding 9% by weight.

4. A bread improver comprising a relatively small proportion of a chlorite of the group consisting of sodium, potassium, ammonium and calcium chlorites and a yeast food dispersed in a carrier of edible starchy material, the moisture content of the mixture not substantially exceeding 9% by weight.

5. A bread improver comprising a relatively small proportion of a chlorite of the group consisting of sodium, potassium, ammonium and calcium chlorites and a small proportion of a suitable additional oxidizing agent dispersed in an edible carrier, the moisture content of the mixture not substantially exceeding 9% by weight.

6. A bread improver comprising a relatively small proportion of sodium chlorite dispersed in a carrier of edible starchy material, the moisture content of the mixture not substantially exceeding 9% by weight.

7. A bread improver comprising an intimate powdered blend of about 0.2 part by weight of sodium chlorite dispersed in about 99.8 parts by weight of a carrier of edible starchy material, the moisture content of the mixture not substantially exceeding 9% by weight.

8. A bread improver comprising an intimate powdered blend of about 0.2 part by weight of sodium chlorite dispersed in about 99.8 parts by weight of a substantially dry corn starch carrier, the moisture content of the mixture not substantially exceeding 9% by weight.

CHARLES G. FERRARI.

CERTIFICATE OF CORRECTION.

Patent No. 2,365,534.   December 19, 1944.

CHARLES G. FERRARI.

It is hereby certified that error appears in the above numbered patent requiring correction as follows: In the grant, line 3, and in the heading to the printed specification, line 5, state of incorporation, for "West Virginia" read --Virginia--, as shown by the record of assignments in this office; and that the said Letters Patent should be read with this correction therein that the same may conform to the record of the case in the Patent Office.

Signed and sealed this 10th day of April, A. D. 1945.

(Seal)            Leslie Frazer
              Acting Commissioner of Patents.